US012732411B1

(12) United States Patent
Mishra et al.

(10) Patent No.: US 12,732,411 B1
(45) Date of Patent: Sep. 8, 2026

(54) DETERMINING A HEALTH OF A NETWORK DEVICE DURING ONBOARDING

(71) Applicant: Juniper Networks, Inc., Sunnyvale, CA (US)

(72) Inventors: Sanjeev Kumar Mishra, Bangalore (IN); Darshan Tirumale Dhanaraj, Bangalore (IN); Sabyasachi Mukhopadhyay, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/476,943

(22) Filed: Sep. 28, 2023

(51) Int. Cl.
*H04L 41/0631* (2022.01)
*G06F 11/07* (2006.01)
*H04L 43/0817* (2022.01)

(52) U.S. Cl.
CPC ........ *H04L 41/0631* (2013.01); *G06F 11/079* (2013.01); *H04L 43/0817* (2013.01)

(58) Field of Classification Search
CPC . H04L 41/0631; H04L 43/0817; G06F 11/079
See application file for complete search history.

(56) References Cited

U.S. PATENT DOCUMENTS 10,574,512 B1 * 2/2020 Mermoud .......... H04L 41/5009
11,063,842 B1 * 7/2021 Vasseur ............... G06N 3/0895
11,366,842 B1 * 6/2022 Swaminathan ..... G06F 16/2477
11,424,999 B2 * 8/2022 De Buitléir ......... H04L 41/0823
11,832,416 B1 * 11/2023 Albright ............. H05K 7/1492
12,288,137 B2 * 4/2025 Slinger ............... G06F 11/3466
2016/0352764 A1 * 12/2016 Mermoud ........... H04L 63/1425
2019/0081851 A1 * 3/2019 Farrell ................. H04L 41/065
2019/0109756 A1 * 4/2019 Abu Lebdeh ....... H04L 41/0286
2019/0306023 A1 * 10/2019 Vasseur ................. G06N 20/20
2019/0356533 A1 * 11/2019 Vasseur ................. G06N 20/00
2019/0380037 A1 * 12/2019 Lifshitz .............. H04W 12/122
2020/0099709 A1 * 3/2020 Vasseur .............. H04L 43/0888
2020/0134423 A1 * 4/2020 Shinde ............... G06F 11/0751
2020/0145304 A1 * 5/2020 Wulff .................... H04L 43/045
2020/0159603 A1 * 5/2020 Panda ................ H04L 43/0817

(Continued)

OTHER PUBLICATIONS

Jason Brownlee, "On the Suitability of Long Short-Term Memory Networks for Time Series Forecasting", available online at <https://machinelearningmastery.com/suitability-long-short-term-memory-networks-time-series-forecasting/>, Aug. 5, 2019, 16 pages.

*Primary Examiner* — Blake J Rubin
(74) *Attorney, Agent, or Firm* — Harrity & Harrity, LLP

(57) ABSTRACT

A device may receive key performance indicators (KPIs) corresponding to a plurality of network devices of a network, and may generate features based on the KPIs. The device may select boundaries for a machine learning model based on the KPIs and the features, and may process the KPIs and the features, with the machine learning model and based on the boundaries, to generate steady state data corresponding to the plurality of network devices. The device may receive new KPIs corresponding to a network device to be added to the network, and may generate new features based on the new KPIs. The device may compare the steady state data with the new KPIs and the new features to identify one or more anomalies corresponding to the network device to be added to the network, and may perform one or more actions based on the one or more anomalies.

20 Claims, 11 Drawing Sheets

100

(56) References Cited

U.S. PATENT DOCUMENTS

2020/0213343 A1* 7/2020 Bharrat .................. G06N 3/045
2020/0252310 A1* 8/2020 Thampy ................. G06N 20/00
2020/0322367 A1* 10/2020 Salvat Lozano .... H04L 41/5009
2020/0322814 A1* 10/2020 Tofighbakhsh ....... H04W 24/02
2020/0379529 A1* 12/2020 Le Goff .................. G06F 1/206
2021/0044563 A1* 2/2021 Reyes ................... G06F 21/564
2021/0158260 A1* 5/2021 Kolar .................. H04L 67/1044
2021/0226866 A1* 7/2021 Vegas ................. H04L 61/4511
2021/0281492 A1* 9/2021 Di Pietro ............... G06N 5/022
2021/0294818 A1* 9/2021 Savalle ............... G06F 16/2477
2021/0304026 A1* 9/2021 Mermoud ................ G06N 3/09
2021/0334656 A1* 10/2021 Sjögren .................. G06N 3/092
2022/0036123 A1* 2/2022 Cummings ............ G06V 10/82
2022/0043955 A1* 2/2022 He ........................... G06N 3/04
2022/0121994 A1* 4/2022 Sun ........................ G06N 20/00
2022/0229957 A1* 7/2022 Venugopal ............... G06N 3/08
2022/0245557 A1* 8/2022 Minter ................... G06N 20/00
2022/0247678 A1* 8/2022 Atwal ................ H04B 7/18519
2022/0292393 A1* 9/2022 Srivastava ......... G06Q 10/0637
2022/0294715 A1* 9/2022 Agrawal ................. H04L 43/04
2023/0105365 A1* 4/2023 Jung ..................... H04W 24/08
706/12
2023/0198860 A1* 6/2023 Bothwell ................ H04L 43/10
709/224
2023/0267373 A1* 8/2023 Ravi ..................... H04L 9/0861
706/12
2023/0273908 A1* 8/2023 Souza Vaz ............ G06F 11/004
707/609
2023/0403201 A1* 12/2023 Johnston ................. H04L 43/55
2024/0022492 A1* 1/2024 Nanda ................... H04L 41/147
2024/0154862 A1* 5/2024 Karam ................ H04L 41/0895
2024/0168857 A1* 5/2024 Ahuja ................. G06F 11/3409
2024/0171479 A1* 5/2024 Malboubi ........... H04L 41/5009
2024/0205100 A1* 6/2024 Richter ................... H04L 41/06
2024/0223458 A1* 7/2024 Singh .................... H04L 41/147
2024/0235923 A1* 7/2024 Magnuson ............. D02G 3/443
2024/0259408 A1* 8/2024 Li ....................... H04L 63/1425
2024/0291835 A1* 8/2024 Sethi ................... H04L 63/1425
2024/0333615 A1* 10/2024 Ford ..................... H04L 43/045
2024/0354239 A1* 10/2024 Bruce ................. G06F 11/3698
2024/0403662 A1* 12/2024 Schell .................... G06N 20/00
2024/0403776 A1* 12/2024 Krishna ........... G06Q 10/06375
2024/0430164 A1* 12/2024 Gad ...................... H04W 24/02
2025/0013921 A1* 1/2025 Moradi .................. G06N 3/082
2025/0053872 A1* 2/2025 Fevold ................... G06N 3/045
2025/0055762 A1* 2/2025 Walker .................... H04L 43/50
2025/0081042 A1* 3/2025 Agarwal ............... H04W 28/10

* cited by examiner

100
Network management system
Machine learning model
KPIs
Features
115
Select boundaries for a machine learning model based on the KPIs and the features
Boundaries 100
Network management system
Anomaly detection
135
Compare the steady state data with the new KPIs and the new features to identify one or more anomalies corresponding to the network device to be added to the network
Anomalies
Steady state data
New KPIs
New features

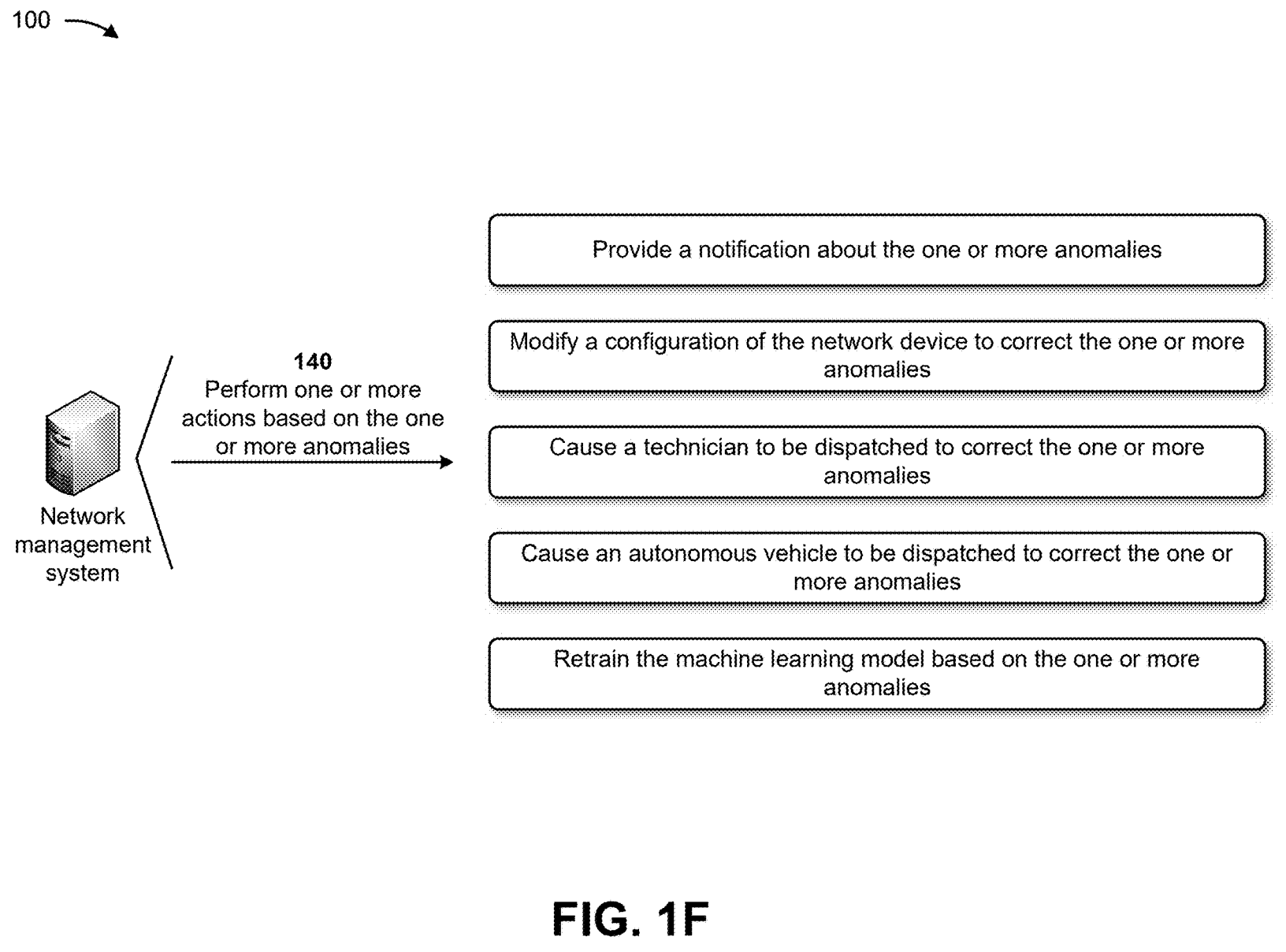

100

Network management system

140
Perform one or more actions based on the one or more anomalies

Provide a notification about the one or more anomalies

Modify a configuration of the network device to correct the one or more anomalies Cause a technician to be dispatched to correct the one or more anomalies Cause an autonomous vehicle to be dispatched to correct the one or more anomalies Retrain the machine learning model based on the one or more anomalies

FIG. 1F

DETERMINING A HEALTH OF A NETWORK DEVICE DURING ONBOARDING

BACKGROUND

Onboarding a new network device for a network requires powering up the network device, updating a software image and a configuration for the network device, ensuring proper cabling and connections for the network device, and bringing the network device online.

SUMMARY

Some implementations described herein relate to a method. The method may include receiving key performance indicators (KPIs) corresponding to a plurality of network devices of a network, and generating features based on the KPIs. The method may include selecting boundaries for a machine learning model based on the KPIs and the features, and processing the KPIs and the features, with the machine learning model and based on the boundaries, to generate steady state data corresponding to the plurality of network devices. The method may include receiving new KPIs corresponding to a network device to be added to the network, and generating new features based on the new KPIs. The method may include comparing the steady state data with the new KPIs and the new features to identify one or more anomalies corresponding to the network device to be added to the network, and performing one or more actions based on the one or more anomalies.

Some implementations described herein relate to a device. The device may include one or more memories and one or more processors. The one or more processors may receive KPIs corresponding to a plurality of network devices of a network, and generate features based on the KPIs. The one or more processors may select boundaries for a machine learning model based on the KPIs and the features, and may process the KPIs and the features, with the machine learning model and based on the boundaries, to generate steady state data corresponding to the plurality of network devices, wherein the machine learning model includes one of a multilayer perceptron model, a long short-term memory (LSTM) model, a bidirectional LSTM model, a Prophet model, or a clustering model. The one or more processors may receive new KPIs corresponding to a network device to be added to the network, and may generate new features based on the new KPIs. The one or more processors may compare the steady state data with the new KPIs and the new features to identify one or more anomalies corresponding to the network device to be added to the network, and may perform one or more actions based on the one or more anomalies.

Some implementations described herein relate to a non-transitory computer-readable medium that stores a set of instructions. The set of instructions, when executed by one or more processors of a device, may cause the device to receive KPIs corresponding to a plurality of network devices of a network, and generate features based on the KPIs. The set of instructions, when executed by one or more processors of the device, may cause the device to select boundaries for a machine learning model based on the KPIs and the features, and process the KPIs and the features, with the machine learning model and based on the boundaries, to generate steady state data corresponding to the plurality of network devices. The set of instructions, when executed by one or more processors of the device, may cause the device to receive new KPIs corresponding to a network device to be added to the network, and generate new features based on the new KPIs. The set of instructions, when executed by one or more processors of the device, may cause the device to compare the steady state data with the new KPIs and the new features to identify one or more anomalies corresponding to the network device to be added to the network, wherein the one or more anomalies correspond to one or more components of the network device. The set of instructions, when executed by one or more processors of the device, may cause the device to perform one or more actions based on the one or more anomalies.

BRIEF DESCRIPTION OF THE DRAWINGS

FIGS. 1A-1F are diagrams of an example associated with determining a health of a network device during onboarding.

DETAILED DESCRIPTION

Figure 1A:
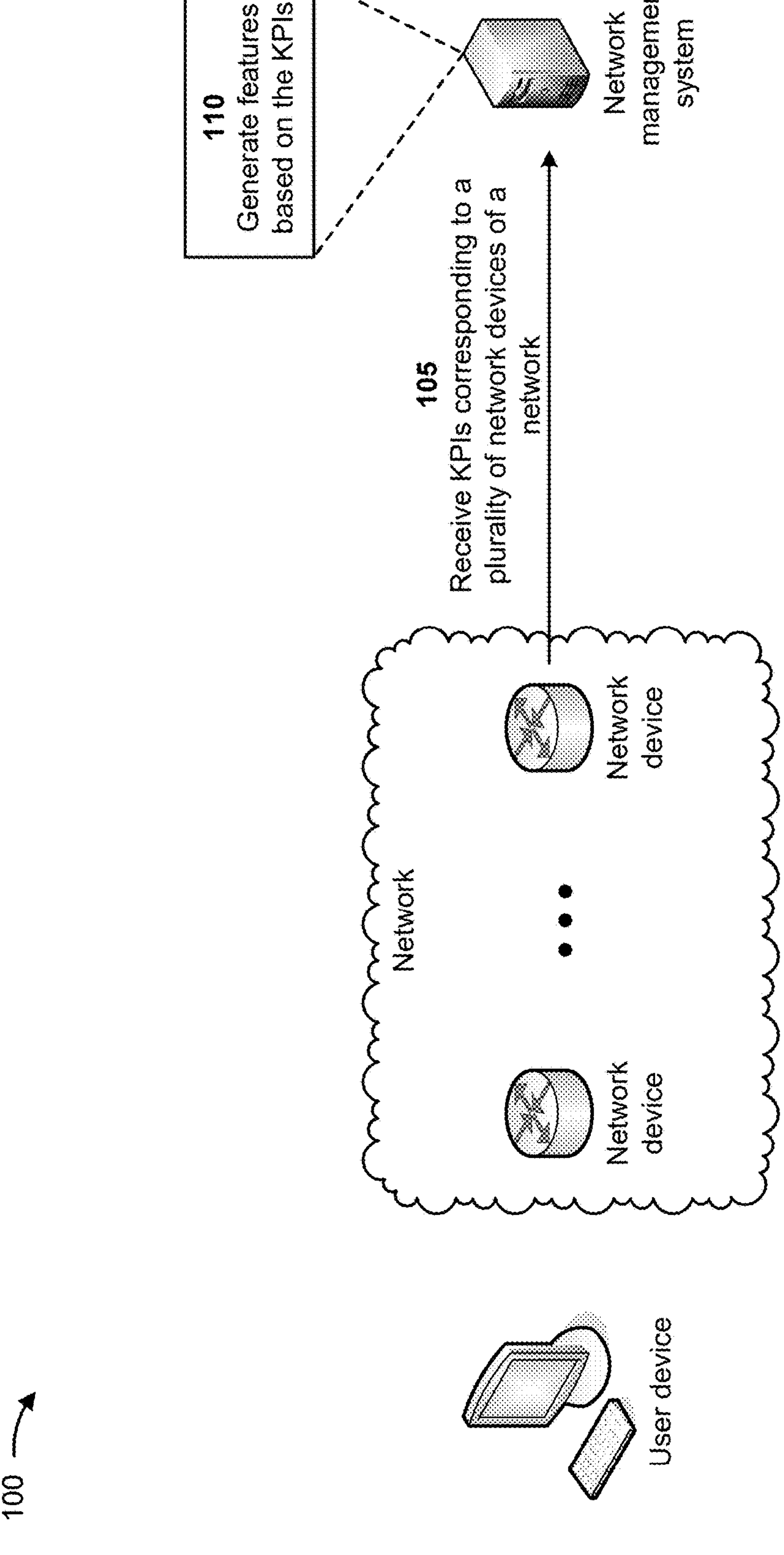

The following detailed description of example implementations refers to the accompanying drawings. The same reference numbers in different drawings may identify the same or similar elements.

The onboarding process for a network device may be complete within few minutes of powering up the network device. Determining whether the onboarded network device or a component of the network device is associated with any anomalies is desirable prior to adding the network device to the network. However, since the onboarding process only lasts a few minutes, there are very few data samples (e.g., for making decisions) that are generated by the network device during the onboarding process. Without sufficient data samples, an anomalous network device may be added to the network and may create problems in the network. Thus, current techniques for onboarding a network device consume computing resources (e.g., processing resources, memory resources, communication resources, and/or the like), networking resources, and/or the like, associated with failing to identify anomalies during the onboarding process of the network device, implementing an anomalous network device in a network, creating network issues based on the anomalous network device, losing traffic due to the anomalous network device, and/or the like.

Some implementations described herein relate to a device (e.g., a network management system) that determines a health of a network device during onboarding. For example, the network management system may receive KPIs corresponding to a plurality of network devices of a network, and may generate features based on the KPIs. The network management system may select boundaries for a machine learning model based on the KPIs and the features, and may process the KPIs and the features, with the machine learning model and based on the boundaries, to generate steady state data corresponding to the plurality of network devices. The network management system may receive new KPIs corresponding to a network device to be added to the network, and may generate new features based on the new KPIs. The network management system may compare the steady state data with the new KPIs and the new features to identify one or more anomalies corresponding to the network device to be added to the network, and may perform one or more actions based on the one or more anomalies.

In this way, the network management system determines a health of a network device during onboarding. For example, the network management system may utilize a machine learning model to determine steady state data based on KPIs corresponding to existing network devices of a network. The network management system may receive new KPIs corresponding to a new (e.g., onboarded) network device, and may compare the new KPIs and the steady state data to determine whether the new network device is associated with an anomaly. The network management system may address an anomaly identified for the network device. Thus, the network management system conserves computing resources, networking resources, and/or the like that would otherwise have been consumed by failing to identify anomalies during the onboarding process of the network device, implementing an anomalous network device in a network, creating network issues based on the anomalous network device, losing traffic due to the anomalous network device, and/or the like.

FIGS. 1A-1F are diagrams of an example 100 associated with determining a health of a network device during onboarding. As shown in FIGS. 1A-1F, example 100 includes a user device and a network management system associated with a network of a plurality of network devices. Further details of the user device, the network management system, the network, and the network devices are provided elsewhere herein.

As shown in FIG. 1A, and by reference number 105, the network management system may receive KPIs corresponding to the plurality of network devices of the network. For example, the plurality of network devices may include different types of network devices, may be provided in different geographical locations associated with the network, and/or the like. The plurality of network devices may generate KPIs corresponding to health of the network devices. For example, the KPIs corresponding to the plurality of network devices may include KPIs corresponding to one or more components of the plurality of network devices, KPIs corresponding to temperatures of the plurality of network devices, KPIs corresponding to processors of the plurality of network devices, KPIs corresponding to memories of the plurality of network devices, KPIs corresponding to fans of the plurality of network devices, KPIs corresponding to power sources of the plurality of network devices, KPIs corresponding to clocks of the plurality of network devices, and/or the like. In some implementations, the network management system may continuously receive the KPIs corresponding to the plurality of network devices from the plurality of network devices, may periodically receive the KPIs corresponding to the plurality of network devices from the plurality of network devices, may receive the KPIs corresponding to the plurality of network devices based on requesting the KPIs from the plurality of network devices, and/or the like.

As further shown in FIG. 1A, and by reference number 110, the network management system may generate features based on the KPIs. For example, the network management system may utilize the KPIs corresponding to the plurality of network devices to generate feature pointers and features corresponding to the KPIs. In some implementations, the feature pointers may include feature pointers corresponding to inlets, routing engines, routing engine processors, flexible physical interface card concentrators (FPCs), and/or the like of the plurality of network devices. In some implementations, the features may include temperatures corresponding to the inlets of the plurality of network devices, temperatures corresponding to the routing engines of the plurality of network devices, temperatures corresponding to the routing engine processors of the plurality of network devices, utilization percentages corresponding to the routing engines of the plurality of network devices, load averages corresponding to the FPCs of the plurality of network devices, memory utilizations corresponding to the routing engines of the plurality of network devices, memory utilizations corresponding to the FPCs of the plurality of network devices, revolutions per minute (RPMs) corresponding to the fans of the plurality of network devices, and/or the like.

Figure 1B:
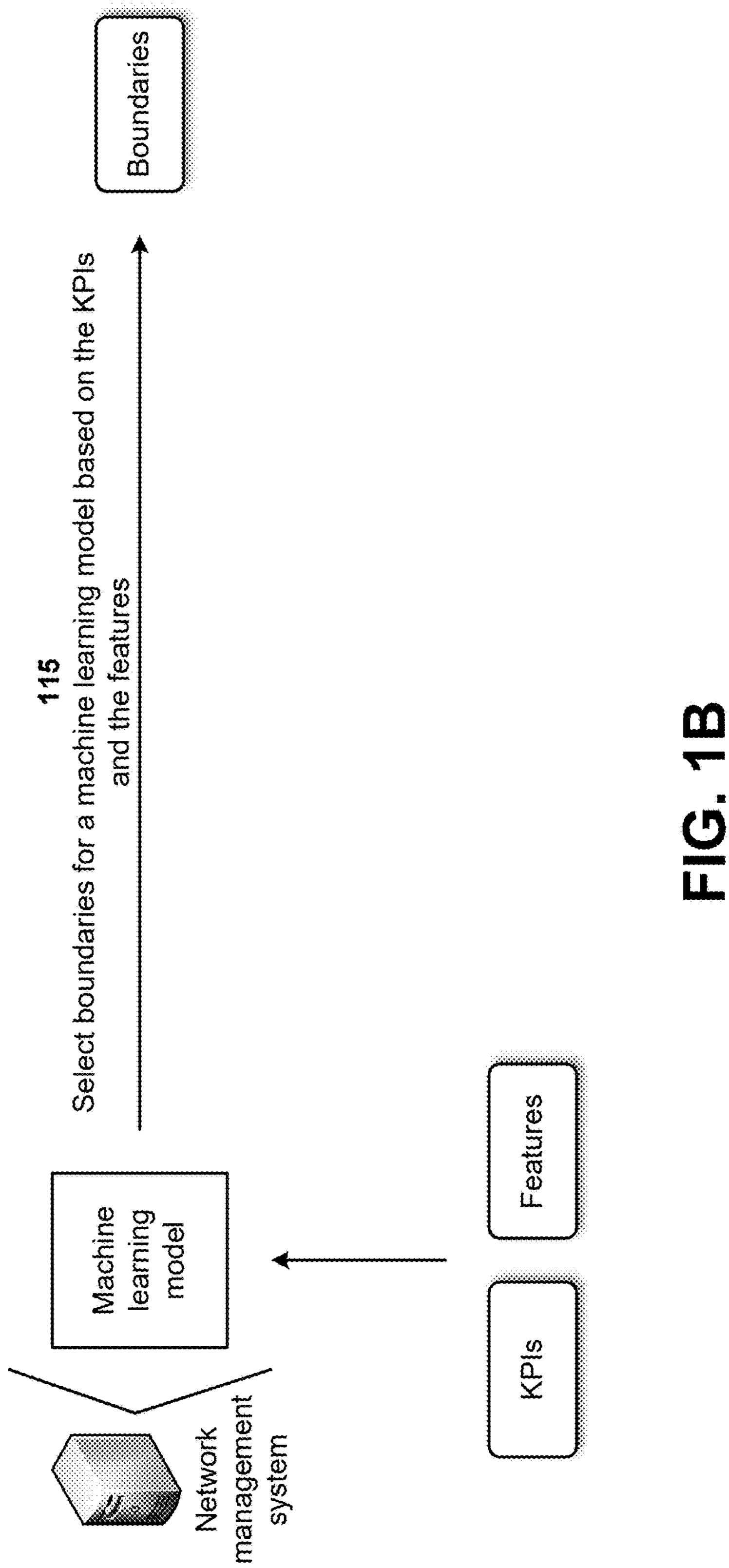

As shown in FIG. 1B, and by reference number 115, the network management system may select boundaries for a machine learning model based on the KPIs and the features. For example, the network management system may be associated with a machine learning model, such as a multilayer perceptron model, a long short-term memory (LSTM) model, a bidirectional LSTM model, a Prophet model, a clustering model, and/or the like. The machine learning model may utilize boundaries for the KPIs and the features corresponding to the plurality of network devices in order to identify anomalies corresponding to the plurality of network devices. In some implementations, the network management system may utilize the KPIs and the features corresponding to the plurality of network devices to select the boundaries for the machine learning model. For example, when selecting the boundaries for the machine learning model based on the KPIs and the features, the network management system may select percentile boundaries, confidence interval boundaries, minimum-maximum boundaries, interquartile range (IQR) boundaries, and/or the like for the machine learning model based on the KPIs and the features.

Figure 1C:
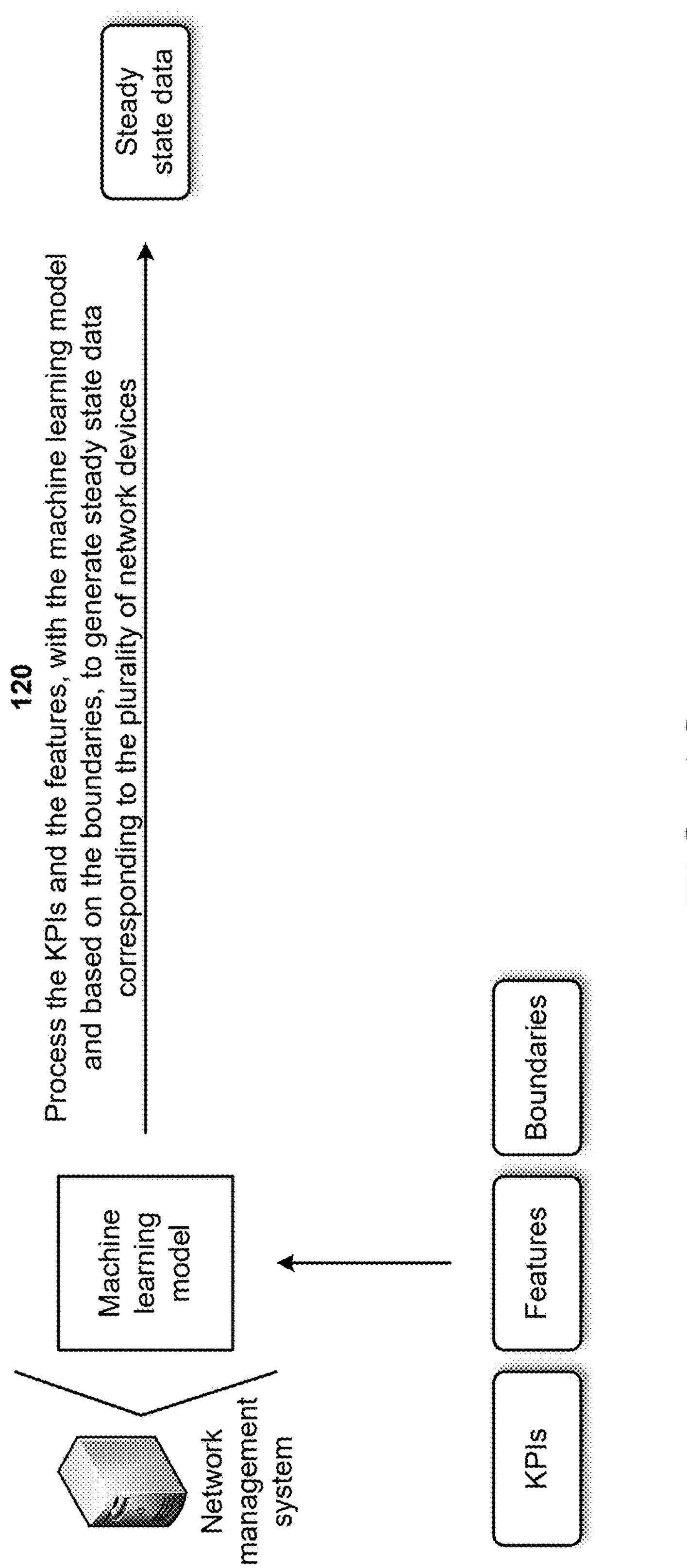

As shown in FIG. 1C, and by reference number 120, the network management system may process the KPIs and the features, with the machine learning model and based on the boundaries, to generate steady state data corresponding to the plurality of network devices. For example, for each of the plurality of network devices, each KPI, and each feature, the machine learning model may calculate a mean value and may forecast a range for multiple percentiles (e.g., 0.5, 0.75, 0.95, and/or the like) into a future time. The machine learning model may compare an actual observed value (e.g., a KPI and/or a feature) and the forecasted range in order to determine whether the KPI and/or the feature corresponds to an anomaly (e.g., an outlier). The machine learning model may determine that a KPI and/or a feature is an anomaly when the KPI and/or the feature is significantly (e.g., greater than a threshold) different than values for the same KPIs and/or features observed in other network devices of the same type and/or at the same geographical location. In some implementations, the machine learning model may utilize a multivariate parallel series methodology to process multiple KPIs and features associated with multiple network devices. In some implementations, the resulting outputs of the machine learning model may be referred to as the steady state data corresponding to the plurality of network devices.

Figure 1D:
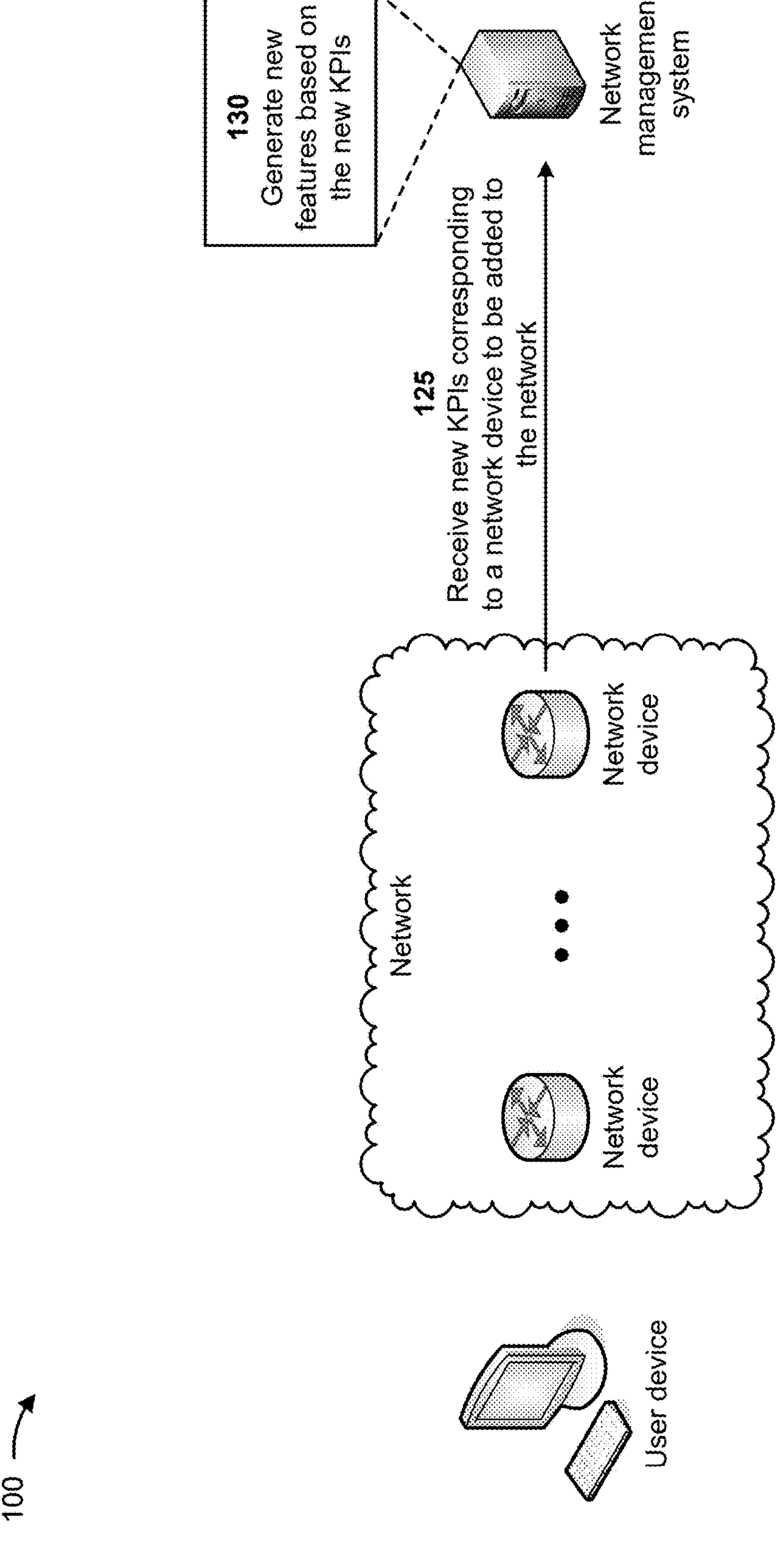

As shown in FIG. 1D, and by reference number 125, the network management system may receive new KPIs corresponding to a network device to be added to the network. For example, when a device is to be onboarded for the network (e.g., added to the network), the network device may be powered up, a software image and a configuration for the network device may be updated, proper cabling and connections for the network device may be provided, and the network device may be brought online. In some implementations, the network device may include a type of network device that is similar to one or more of the plurality of network devices and may be provided at a geographical location similar to (or the same as) a geographical location of one or more of the plurality of network devices.

While the network device is being onboarded, the network device may generate the new KPIs corresponding to a health of the network device. For example, the KPIs corresponding to the network device may include KPIs corresponding to one or more components of the network device, a KPI corresponding to a temperature of the network device, a KPI corresponding to a processor of the network device, a KPI corresponding to a memory of the network device, a KPI corresponding to a fan of the network device, a KPI corresponding to a power source of the network device, a KPI corresponding to a clock of the network device, and/or the like. In some implementations, the network management system may continuously receive the new KPIs corresponding to the network devices from the network device (e.g., during onboarding), may periodically receive the new KPIs corresponding to the network device from the network device, may receive the KPIs corresponding to the network device based on requesting the KPIs from the network device, and/or the like.

As further shown in FIG. 1D, and by reference number 130, the network management system may generate new features based on the new KPIs. For example, the network management system may utilize the new KPIs corresponding to the network device to generate new feature pointers and new features corresponding to the new KPIs. In some implementations, the new feature pointers may include feature pointers corresponding to an inlet, a routing engine, a routing engine processor, an FPC, and/or the like of the network device. In some implementations, the new features may include a temperature of the inlet of the network device, a temperature of the routing engine of the network device, a temperature of the routing engine processor of the network device, a utilization percentage of the routing engines of the network device, a load average of the FPCs of the network device, a memory utilization of the routing engine of the network device, a memory utilization of the FPC of the network device, an RPM of the fan of the network device, and/or the like.

Figure 1E:
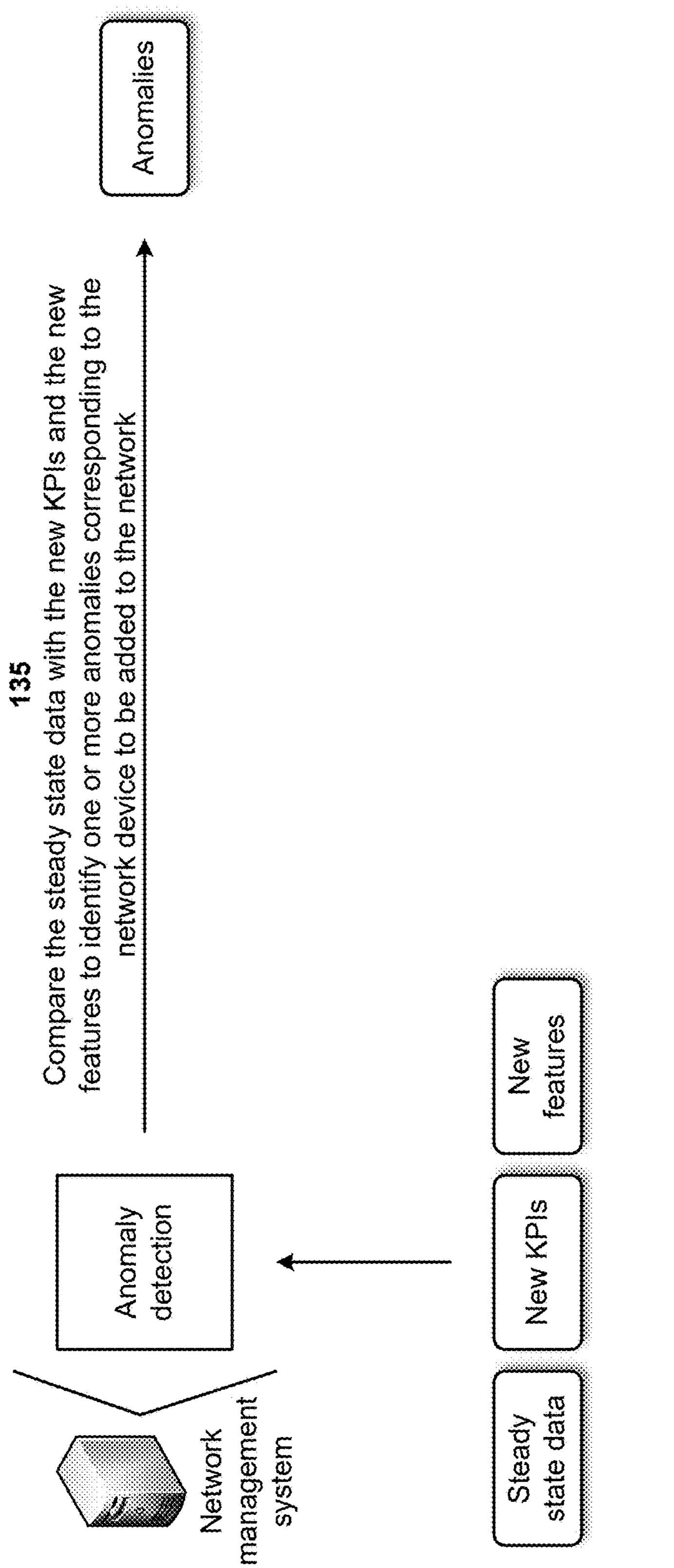

As shown in FIG. 1E, and by reference number 135, the network management system may compare the steady state data with the new KPIs and the new features to identify one or more anomalies corresponding to the network device to be added to the network. For example, the network management system may determine a new KPI for the network device to be normal or anomalous based on the steady state data corresponding to the plurality of network devices of the same type as the network device, at the same geographical location as the network device, with the same organization as the network device, of the same type but at different geographical locations, of different types but at the same geographical location, and/or the like. In one example, the network device may be a first type of network device (e.g., a router) and a KPI corresponding to a temperature of the routing engine of the network device may be utilized. In such an example, the network management system may utilize steady state data identifying normal temperatures of routing engines of the plurality of network devices that are the first type of network device. The network management system may compare such steady state data and the KPI corresponding to a temperature of the routing engine of the network device to determine whether the KPI of the network device is normal or anomalous. In some implementations, the network management system may include multiple device types in a same bucket to extend the comparison to the plurality of network devices of device types belonging to the same bucket.

In another example, the network device may be located at a first geographical location (e.g., based on a location identifier) and a KPI corresponding to a temperature of the routing engine of the network device may be utilized. In such an example, the network management system may utilize steady state data identifying normal temperatures of routing engines of the plurality of network devices that are located at the first geographical location. The network management system may compare such steady state data and the KPI corresponding to a temperature of the routing engine of the network device to determine whether the KPI of the network device is normal or anomalous.

In some implementations, the network management system may utilize steady state data corresponding to a network device type, a geographical location, and/or the like when comparing the steady state data and the new KPIs and the new features to identify the one or more anomalies corresponding to the network device. In such implementations, a union of forecasting and/or cluster ranges for the plurality of network devices in the selected set may determine whether the new KPI for the network device (being onboarded) is normal or anomalous (e.g., based on whether the new KPI is within the union of the range or outside the union of the range).

In some implementations, the network management system may compare the steady state data with the new KPIs and the new features and may not identify any anomalies corresponding to the network device. In such implementations, the network management system may cause the network device to be added to the network and placed into service.

In some implementations, the network management system may determine ranges (e.g., with lower values and upper values) for KPIs of the same types of network devices based on the steady state data, where the lower values of the ranges may correspond to minimum KPI values of the same types of network devices and the upper values may correspond to maximum KPI values of the same types of network devices. The network management system may determine whether the new KPI for the network device (being onboarded) is within a corresponding one of the determined ranges. If the new KPI is within the corresponding one of the determined ranges, the network management system may determine that the new KPI is not anomalous. If the new KPI is not within the corresponding one of the determined ranges, the network management system may determine that the new KPI is anomalous.

In some implementations, the network management system may determine ranges (e.g., with lower values and upper values) for KPIs of the network devices at the same geographical locations and based on the steady state data, where the lower values of the ranges may correspond to minimum KPI values of the network devices and the upper values may correspond to maximum KPI values of the network devices. The network management system may determine whether the new KPI for the network device (being onboarded) is within a corresponding one of the determined ranges. If the new KPI is within the corresponding one of the determined ranges, the network management system may determine that the new KPI is not anomalous. If the new KPI is not within the corresponding one of the determined ranges, the network management system may determine that the new KPI is anomalous.

As shown in FIG. 1F, and by reference number 140, the network management system may perform one or more actions based on the one or more anomalies. In some implementations, performing the one or more actions includes the network management system providing a notification about the one or more anomalies. For example, the network management system may identify an anomaly associated with the processor of the network device, and may generate a notification identifying the anomaly. The network management system may provide the notification to a user device (e.g., a computer, a cell phone, and/or the like) associated with a technician, and the technician may address the anomaly associated with the processor of the network device. In this way, the network management system conserves computing resources, networking resources, and/or the like that would otherwise have been consumed by failing to identify anomalies during the onboarding process of the network device.

In some implementations, performing the one or more actions includes the network management system modifying a configuration of the network device to correct the one or more anomalies. For example, the network management system may identify an anomaly associated with the memory of the network device, and may generate software to modify a configuration of the memory. The network management system may provide the software to the network device and the network device may execute the software. Execution of the software may modify the configuration of the memory of the network device and may correct the anomaly. In this way, the network management system conserves computing resources, networking resources, and/or the like that would otherwise have been consumed by implementing an anomalous network device in a network.

In some implementations, performing the one or more actions includes the network management system causing a technician to be dispatched to correct the one or more anomalies. For example, the network management system may identify an anomaly associated with the routing engine of the network device, and may provide information identifying the anomaly to a technician. The technician may utilize the information to locate the network device and to correct the anomaly associated with the routing engine of the network device. In this way, the network management system conserves computing resources, networking resources, and/or the like that would otherwise have been consumed by creating network issues based on the anomalous network device.

In some implementations, performing the one or more actions includes the network management system causing an autonomous vehicle to be dispatched to correct the one or more anomalies. For example, the network management system may identify an anomaly associated with the fan of the network device, and may provide information identifying the anomaly to an autonomous vehicle. The network management system may instruct the autonomous vehicle to correct the anomaly and the autonomous vehicle may utilize the information to locate the network device and to correct the anomaly associated with the fan of the network device. In this way, the network management system conserves computing resources, networking resources, and/or the like that would otherwise have been consumed by failing to identify anomalies during the onboarding process of the network device, implementing an anomalous network device in a network, creating network issues based on the anomalous network device, losing traffic due to the anomalous network device, and/or the like.

In some implementations, performing the one or more actions includes the network management system retraining the machine learning model based on the one or more anomalies. For example, the network management system may utilize the one or more anomalies as additional training data for retraining the machine learning model, thereby increasing the quantity of training data available for training the machine learning model. Accordingly, the network management system may conserve computing resources associated with identifying, obtaining, and/or generating historical data for training the machine learning model relative to other systems for identifying, obtaining, and/or generating historical data for training machine learning models.

In this way, the network management system determines a health of a network device during onboarding. For example, the network management system may utilize a machine learning model to determine steady state data based on KPIs corresponding to existing network devices of a network. The network management system may receive new KPIs corresponding to a new (e.g., onboarded) network device, and may compare the new KPIs and the steady state data to determine whether the new network device is associated with an anomaly. The network management system may address an anomaly identified for the network device. Thus, the network management system conserves computing resources, networking resources, and/or the like that would otherwise have been consumed by failing to identify anomalies during the onboarding process of the network device, implementing an anomalous network device in a network, creating network issues based on the anomalous network device, losing traffic due to the anomalous network device, and/or the like.

Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
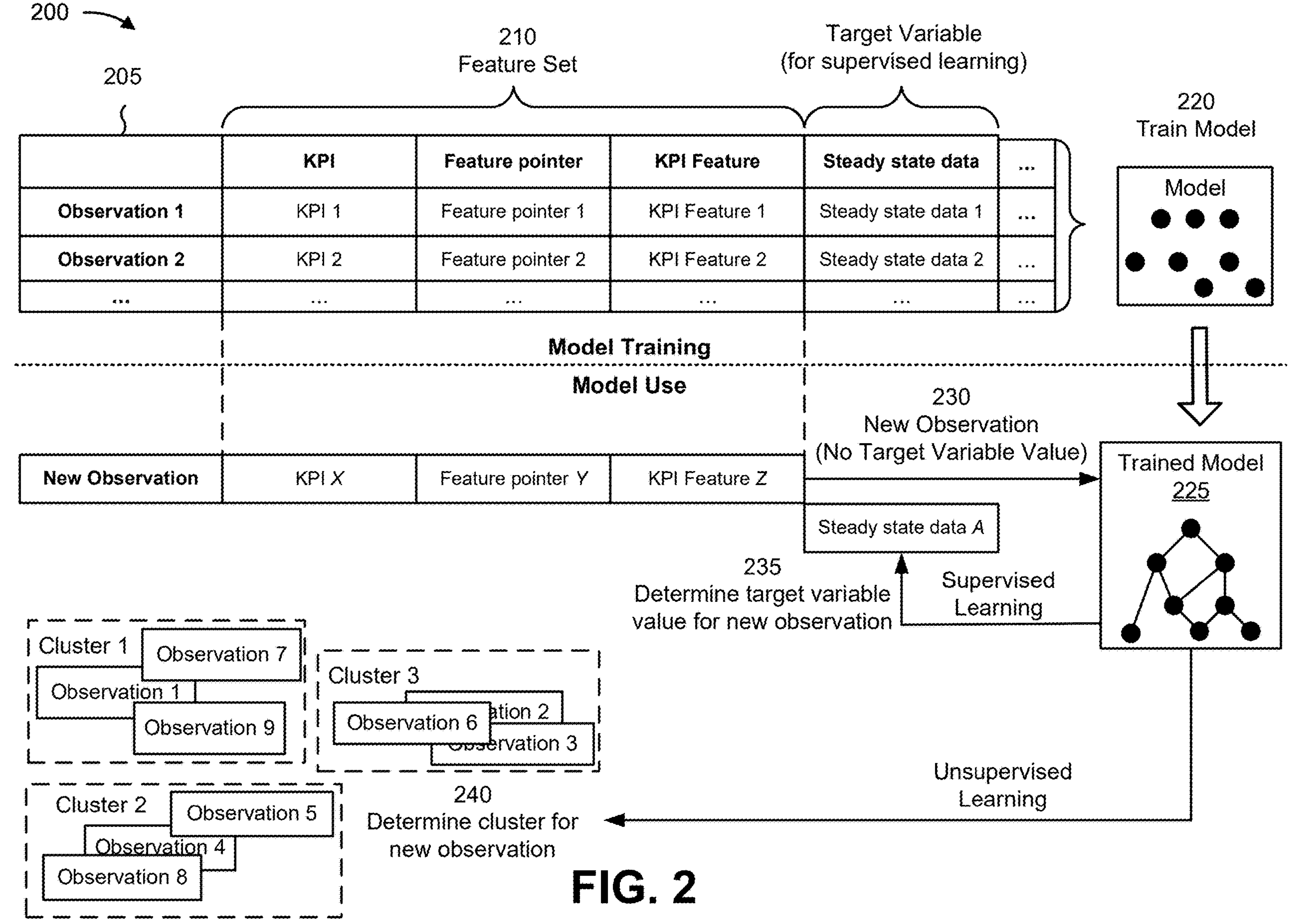
FIG. 2 is a diagram illustrating an example of training and using a machine learning model in connection with systems and methods for identifying anomalies in network devices.

FIG. 2 is a diagram illustrating an example 200 of training and using a machine learning model in connection with systems and methods for detecting anomalies in network devices. The machine learning model training and usage described herein may be performed using a machine learning system. The machine learning system may include or may be included in a computing device, a server, a cloud computing environment, or the like, such as the network management system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input), as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on the input. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a KPI, a second feature of a feature pointer, a third feature of a KPI feature, and so on. As shown, for a first observation, the first feature may have a value of KPI 1, the second feature may have a value of feature pointer 1, the third feature may have a value of KPI feature 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is steady state data, which has a value of steady state data 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of KPI X, a second feature of feature pointer Y, a third feature of KPI feature Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of steady state data A for the target variable of the steady state data for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a KPI cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a feature pointer cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to detecting anomalies in network devices. The machine learning system may enable recognition and/or identification of tens, hundreds, thousands, or millions of features and/or feature values for tens, hundreds, thousands, or millions of observations, thereby increasing accuracy and consistency and reducing delay associated with detecting anomalies in network devices relative to requiring computing resources to be allocated for tens, hundreds, or thousands of operators to manually detect anomalies in network devices using the features or feature values.

As indicated above, FIG. 2 is provided is an example. Other examples may differ from what is described in connection with FIG. 2.

Figure 3:
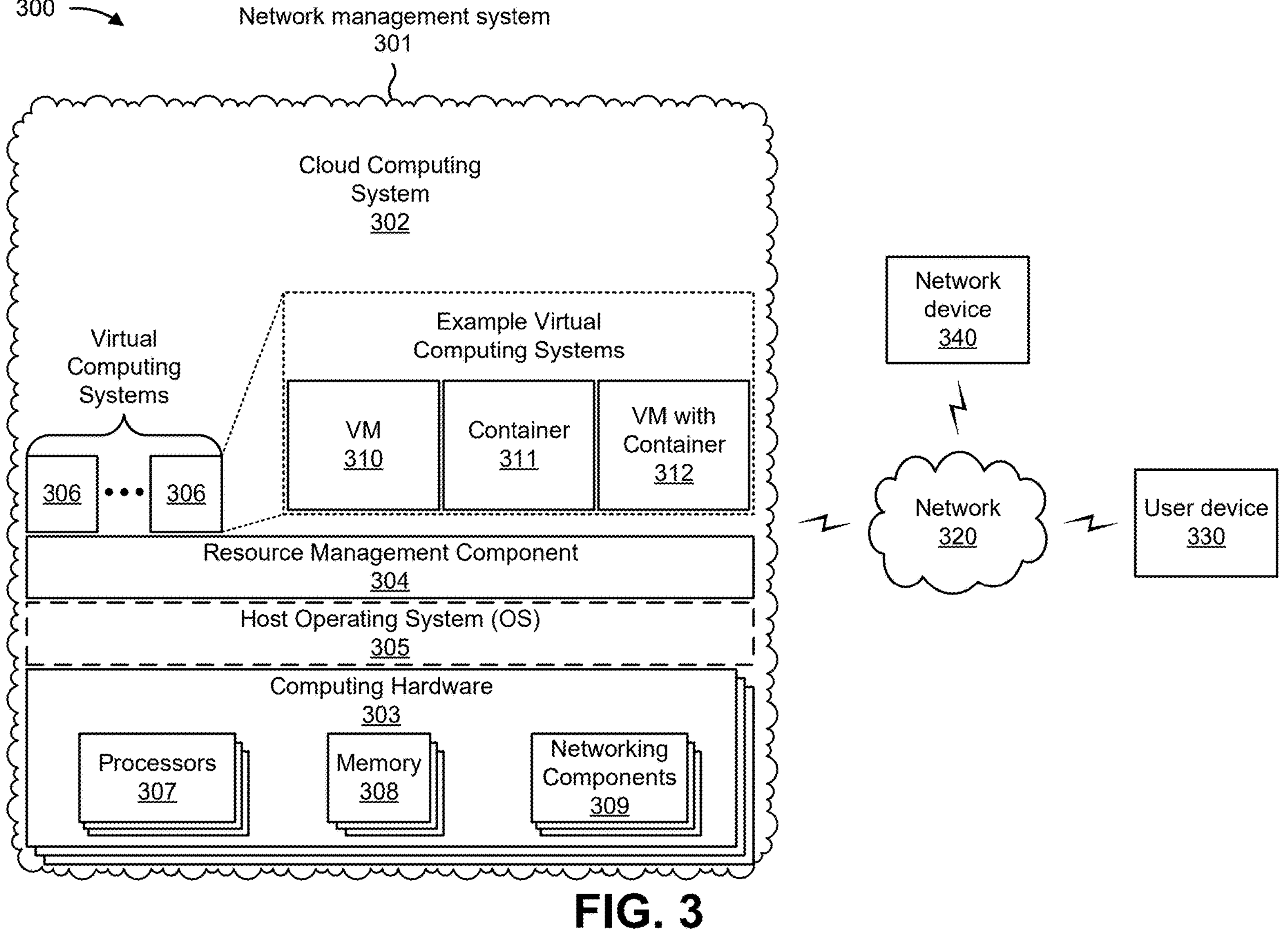
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a network management system 301, which may include one or more elements of and/or may execute within a cloud computing system 302. The cloud computing system 302 may include one or more elements 303-312, as described in more detail below. As further shown in FIG. 3, the environment 300 may include a network 320, a user device 330, and/or a network device 340. Devices and/or elements of the environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as the computing hardware 303) capable of virtualizing the computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using the computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the network management system 301 may include one or more elements 303-312 of the cloud computing system 302, may execute within the cloud computing system 302, and/or may be hosted within the cloud computing system 302, in some implementations, the network management system 301 may not be cloud-based (e.g., may be implemented outside of a cloud computing system) or may be partially cloud-based. For example, the network management system 301 may include one or more devices that are not part of the cloud computing system 302, such as a device 400 of FIG. 4, which may include a standalone server or another type of computing device. The network management system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 340 may include one or more devices capable of receiving, processing, storing, routing, and/or providing traffic (e.g., a packet and/or other information or metadata) in a manner described herein. For example, the network device 340 may include a router, such as a label switching router (LSR), a label edge router (LER), an ingress router, an egress router, a provider router (e.g., a provider edge router or a provider core router), a virtual router, or another type of router. Additionally, or alternatively, the network device 340 may include a gateway, a switch, a firewall, a hub, a bridge, a reverse proxy, a server (e.g., a proxy server, a cloud server, or a data center server), a load balancer, and/or a similar device. In some implementations, the network device 340 may be a physical device implemented within a housing, such as a chassis. In some implementations, the network device 340 may be a virtual device implemented by one or more computing devices of a cloud computing environment or a data center. In some implementations, a group of network devices 340 may be a group of data center nodes that are used to route traffic flow through a network.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
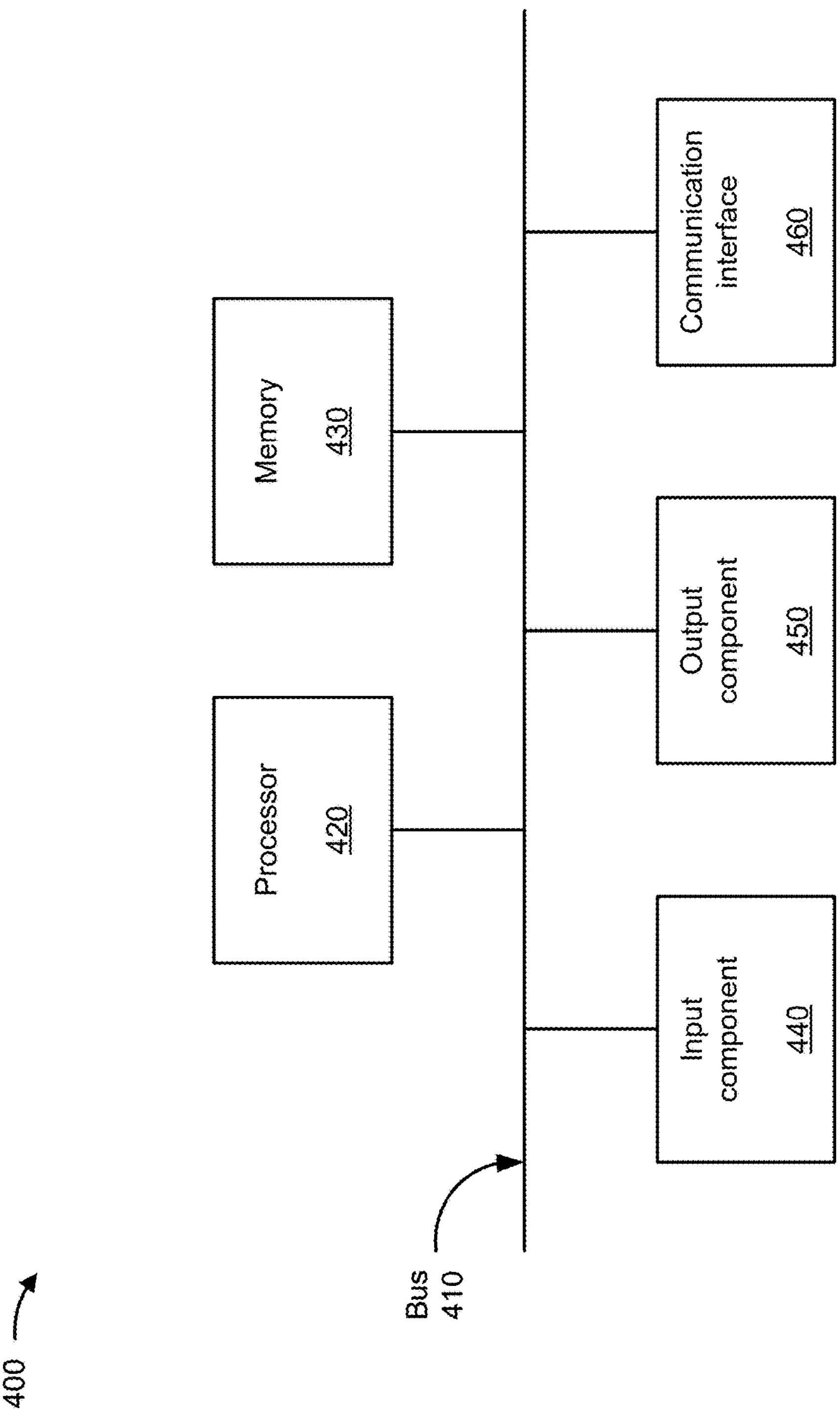
FIGS. 4 and 5 are diagrams of example components of one or more devices of FIG. 3.

FIG. 4 is a diagram of example components of one or more devices of FIG. 3. The example components may be included in a device 400, which may correspond to the network management system 301, the user device 330, and/or the network device 340. In some implementations, the network management system 301, the user device 330, and/or the network device 340 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
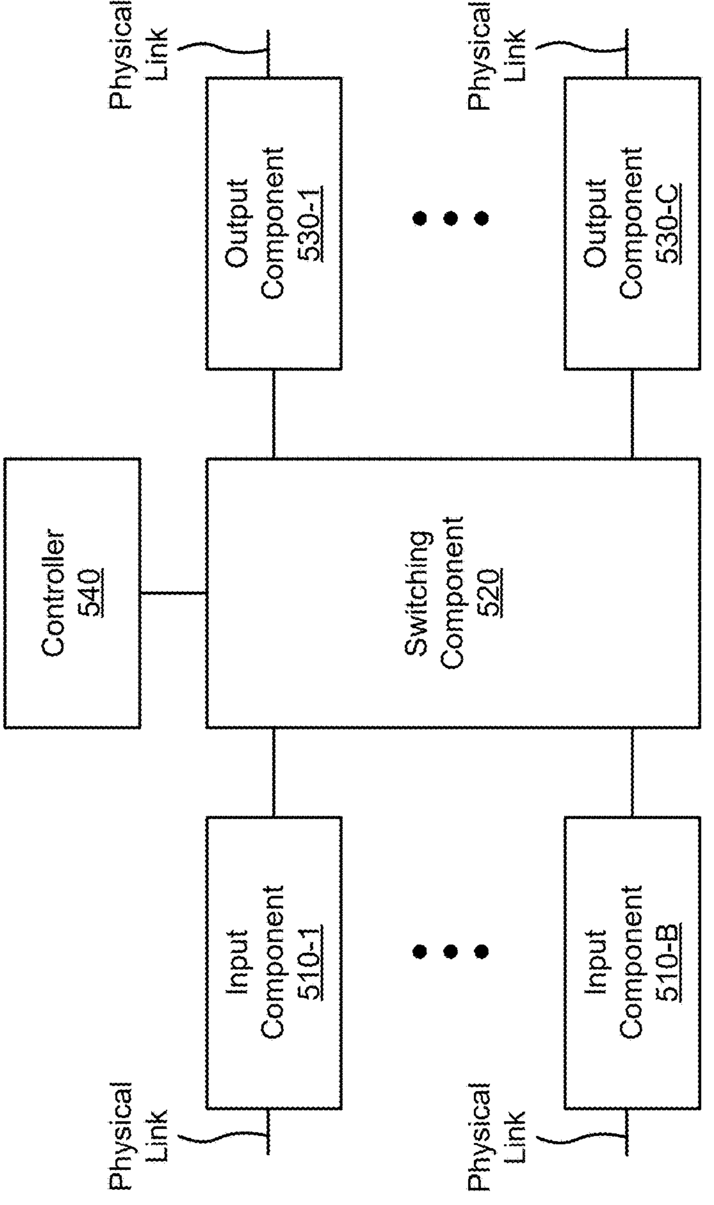

FIG. 5 is a diagram of example components of one or more devices of FIG. 3. The example components may be included in a device 500. The device 500 may correspond to the network device 340. In some implementations, the network device 340 may include one or more devices 500 and/or one or more components of the device 500. As shown in FIG. 5, the device 500 may include one or more input components 510-1 through 510-B ($B \geq 1$) (hereinafter referred to collectively as input components 510, and individually as input component 510), a switching component 520, one or more output components 530-1 through 530-C ($C \geq 1$) (hereinafter referred to collectively as output components 530, and individually as output component 530), and a controller 540.

The input component 510 may be one or more points of attachment for physical links and may be one or more points of entry for incoming traffic, such as packets. The input component 510 may process incoming traffic, such as by performing data link layer encapsulation or decapsulation. In some implementations, the input component 510 may transmit and/or receive packets. In some implementations, the input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, the device 500 may include one or more input components 510.

The switching component 520 may interconnect the input components 510 with the output components 530. In some implementations, the switching component 520 may be implemented via one or more crossbars, via busses, and/or with shared memories. The shared memories may act as temporary buffers to store packets from the input components 510 before the packets are eventually scheduled for delivery to the output components 530. In some implementations, the switching component 520 may enable the input components 510, the output components 530, and/or the controller 540 to communicate with one another.

The output component 530 may store packets and may schedule packets for transmission on output physical links. The output component 530 may support data link layer encapsulation or decapsulation, and/or a variety of higher-level protocols. In some implementations, the output component 530 may transmit packets and/or receive packets. In some implementations, the output component 530 may include an output line card that includes one or more packet processing components (e.g., in the form of integrated circuits), such as one or more IFCs, packet forwarding components, line card controller components, output ports, processors, memories, and/or output queues. In some implementations, the device 500 may include one or more output components 530. In some implementations, the input component 510 and the output component 530 may be implemented by the same set of components (e.g., and input/output component may be a combination of the input component 510 and the output component 530).

The controller 540 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 540 may include one or more processors that can be programmed to perform a function.

In some implementations, the controller 540 may include a RAM, a ROM, and/or another type of dynamic or static storage device (e.g., a flash memory, a magnetic memory, an optical memory, etc.) that stores information and/or instructions for use by the controller 540.

In some implementations, the controller 540 may communicate with other devices, networks, and/or systems connected to the device 500 to exchange information regarding network topology. The controller 540 may create routing tables based on the network topology information, may create forwarding tables based on the routing tables, and may forward the forwarding tables to the input components 510 and/or output components 530. The input components 510 and/or the output components 530 may use the forwarding tables to perform route lookups for incoming and/or outgoing packets.

The controller 540 may perform one or more processes described herein. The controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 540 from another computer-readable medium or from another device via a communication interface. When executed, software instructions stored in a memory and/or storage component associated with the controller 540 may cause the controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, the device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
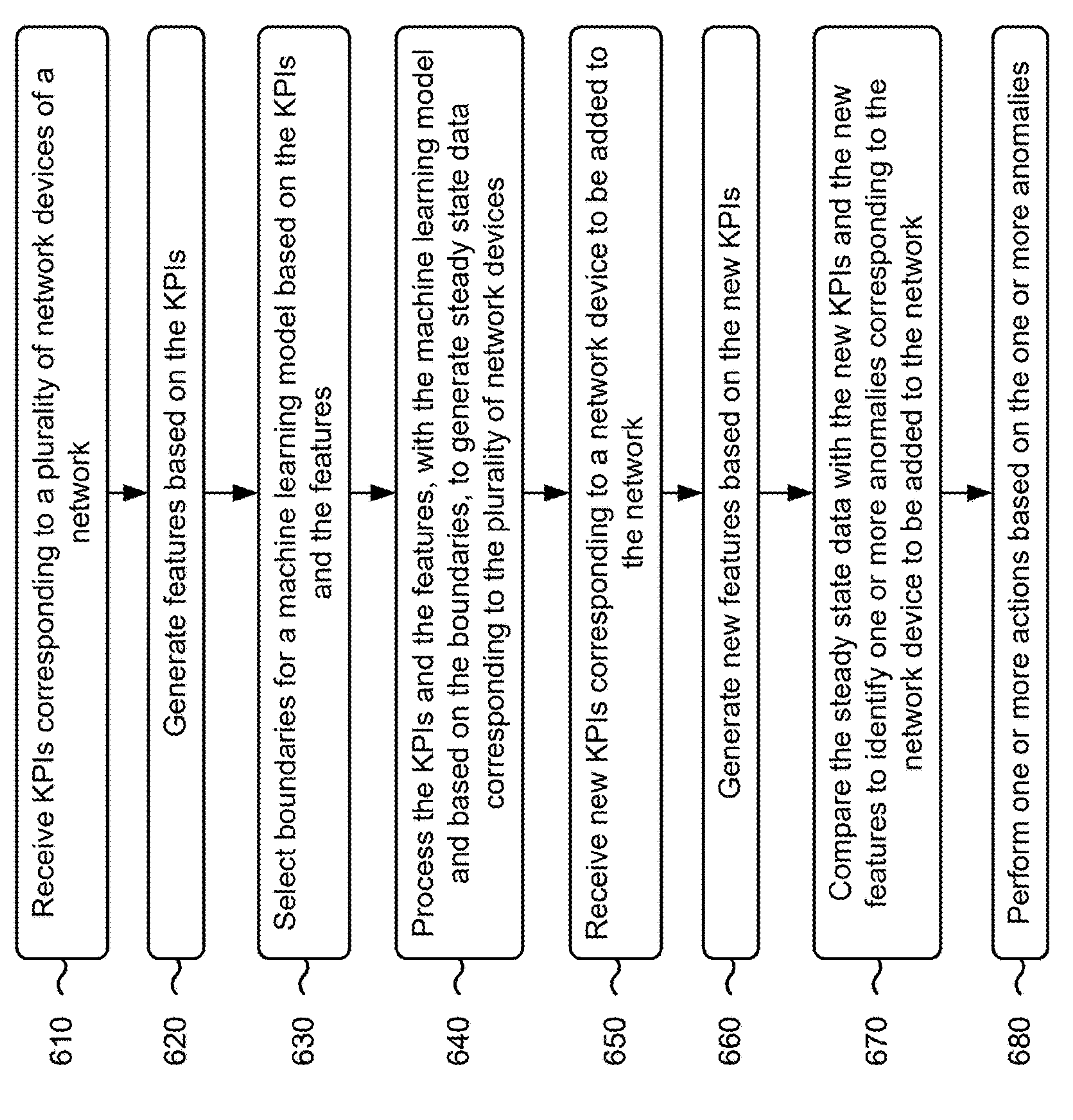
FIG. 6 is a flowchart of an example process for determining a health of a network device during onboarding.

FIG. 6 is a flowchart of an example process 600 for determining a health of a network device during onboarding. In some implementations, one or more process blocks of FIG. 6 may be performed by a device (e.g., the network management system 301). In some implementations, one or more process blocks of FIG. 6 may be performed by another device or a group of devices separate from or including the device, such as a network device (e.g., the network device 340). Additionally, or alternatively, one or more process blocks of FIG. 6 may be performed by one or more components of the device 400, such as the processor 420, the memory 430, the input component 440, the output component 450, and/or the communication interface 460. Additionally, or alternatively, one or more process blocks of FIG. 6 may be performed by one or more components of the device 500, such as the input component 510, the switching component 520, the output component 530, and/or the controller 540.

As shown in FIG. 6, process 600 may include receiving KPIs corresponding to a plurality of network devices of a network (block 610). For example, the device may receive KPIs corresponding to a plurality of network devices of a network, as described above. In some implementations, the KPIs include one or more of KPIs corresponding to temperatures of the plurality of network devices, KPIs corresponding to processors of the plurality of network devices, KPIs corresponding to memories of the plurality of network devices, KPIs corresponding to fans of the plurality of network devices, KPIs corresponding to power sources of the plurality of network devices, or KPIs corresponding to clocks of the plurality of network devices. In some implementations, the plurality of network devices are selected based on one or more of device types of the plurality of network devices or geographical locations of the plurality of network device.

As further shown in FIG. 6, process 600 may include generating features based on the KPIs (block 620). For example, the device may generate features based on the KPIs, as described above. In some implementations, the features include one or more of features corresponding to current temperatures of the plurality of network devices, featuring corresponding to loads and utilizations of processors of the plurality of network devices, features corresponding to utilizations of memories of the plurality of network devices, or features corresponding to revolutions per minute of fans of the plurality of network devices.

As further shown in FIG. 6, process 600 may include selecting boundaries for a machine learning model based on the KPIs and the features (block 630). For example, the device may select boundaries for a machine learning model based on the KPIs and the features, as described above. In some implementations, selecting the boundaries for the machine learning model based on the KPIs and the features includes selecting one of percentile boundaries, confidence interval boundaries, minimum-maximum boundaries, or interquartile range boundaries for the machine learning model based on the KPIs and the features. In some implementations, the machine learning model includes one of a multilayer perceptron model, an LSTM model, a bidirectional LSTM model, a Prophet model, or a clustering model.

As further shown in FIG. 6, process 600 may include processing the KPIs and the features, with the machine learning model and based on the boundaries, to generate steady state data corresponding to the plurality of network devices (block 640). For example, the device may process the KPIs and the features, with the machine learning model and based on the boundaries, to generate steady state data corresponding to the plurality of network devices, as described above.

As further shown in FIG. 6, process 600 may include receiving new KPIs corresponding to a network device to be added to the network (block 650). For example, the device may receive new KPIs corresponding to a network device to be added to the network, as described above. In some implementations, the new KPIs include one or more of a KPI corresponding to a temperature of the network device, a KPI corresponding to a processor of the network device, a KPI corresponding to a memory of the network device, a KPI corresponding to a fan of the network device, a KPI corresponding to a power source of the network device, or a KPI corresponding to a clock of the network device.

As further shown in FIG. 6, process 600 may include generating new features based on the new KPIs (block 660). For example, the device may generate new features based on the new KPIs, as described above. In some implementations, the new features include one or more of a feature corresponding to a current temperature of the network device, a feature corresponding to a load and a utilization of a processor of the network device, a feature corresponding to a utilization of a memory of the network device, or a feature corresponding to revolutions per minute of a fan of the network device.

As further shown in FIG. 6, process 600 may include comparing the steady state data with the new KPIs and the new features to identify one or more anomalies corresponding to the network device to be added to the network (block 670). For example, the device may compare the steady state data with the new KPIs and the new features to identify one or more anomalies corresponding to the network device to be added to the network, as described above. In some implementations, comparing the steady state data with the new KPIs and the new features to identify the one or more anomalies includes identifying, from the plurality of network devices, a set of network devices similar to the network device to be added to the network, and comparing the steady state data, corresponding to the set of network devices, with the new KPIs and the new features to identify the one or more anomalies. In some implementations, the one or more anomalies correspond to one or more components of the network device.

As further shown in FIG. 6, process 600 may include performing one or more actions based on the one or more anomalies (block 680). For example, the device may perform one or more actions based on the one or more anomalies, as described above. In some implementations, performing the one or more actions includes one or more of providing a notification about the one or more anomalies, or modifying a configuration of the network device to correct the one or more anomalies. In some implementations, performing the one or more actions includes one or more of causing a technician to be dispatched to correct the one or more anomalies, causing an autonomous vehicle to be dispatched to correct the one or more anomalies, or retraining the machine learning model based on the one or more anomalies. In some implementations, performing the one or more actions includes preventing the network device from being added to the network based on the one or more anomalies.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, key performance indicators (KPIs) corresponding to a plurality of network devices of a network;

generating, by the device, features based on the KPIs by generating the features corresponding to the KPIs related to components of the plurality of network devices, wherein the plurality of network devices include different types of network devices;

selecting, by the device, boundaries for a machine learning model based on the KPIs and the features;

processing, by the device, the KPIs and the features, with the machine learning model and based on the boundaries, to generate steady state data corresponding to the plurality of network devices, wherein the steady state data is associated with a forecasted range for multiple percentiles in a future time related to the KPIs, that is determined based on using the machine learning model;

receiving, by the device, new KPIs corresponding to a network device to be added to the network;

generating, by the device, new features based on the new KPIs;

comparing, by the device and during onboarding of the network device, the steady state data with the new KPIs and the new features to identify one or more anomalies corresponding to the network device being onboarded to be added to the network, wherein comparing the steady state data comprises:

utilizing, for the comparison, a subset of the steady state data corresponding to a subset of particular network devices of a same device type of the plurality of network devices as a type of device of the network device, wherein the subset of the steady state data further corresponds to the particular network devices located in a same geographical location as the network device and of the same type of device; and performing, by the device, one or more actions based on the one or more anomalies.

2. The method of claim 1, wherein the KPIs include one or more of:

KPIs corresponding to temperatures of the plurality of network devices,

KPIs corresponding to processors of the plurality of network devices,

KPIs corresponding to memories of the plurality of network devices,

KPIs corresponding to fans of the plurality of network devices,

KPIs corresponding to power sources of the plurality of network devices, or

KPIs corresponding to clocks of the plurality of network devices.

3. The method of claim 1, wherein the new KPIs include one or more of:

a KPI corresponding to a temperature of the network device, a KPI corresponding to a processor of the network device, a KPI corresponding to a memory of the network device, a KPI corresponding to a fan of the network device, a KPI corresponding to a power source of the network device, or a KPI corresponding to a clock of the network device.

4. The method of claim 1, wherein the features include one or more of:

features corresponding to current temperatures of the plurality of network devices, features corresponding to loads and utilizations of processors of the plurality of network devices, features corresponding to utilizations of memories of the plurality of network devices, or features corresponding to revolutions per minute of fans of the plurality of network devices.

5. The method of claim 1, wherein the new features include one or more of:

a feature corresponding to a current temperature of the network device, a feature corresponding to a load and a utilization of a processor of the network device, a feature corresponding to a utilization of a memory of the network device, or a feature corresponding to revolutions per minute of a fan of the network device.

6. The method of claim 1, wherein selecting the boundaries for the machine learning model based on the KPIs and the features comprises:

selecting one of percentile boundaries, confidence interval boundaries, minimum-maximum boundaries, or interquartile range boundaries for the machine learning model based on the KPIs and the features.

7. The method of claim 1, wherein the machine learning model includes one of:

a multilayer perceptron model, a long short-term memory (LSTM) model, a bidirectional LSTM model, a Prophet model, or a clustering model.

8. A device, comprising:

one or more memories; and one or more processors to:

receive key performance indicators (KPIs) corresponding to a plurality of network devices of a network;

generate features based on the KPIs by generating the features corresponding to the KPIs related to components of the plurality of network devices, wherein the plurality of network devices include different types of network devices;

select boundaries for a machine learning model based on the KPIs and the features;

process the KPIs and the features, with the machine learning model and based on the boundaries, to generate steady state data corresponding to the plurality of network devices, wherein the machine learning model includes one of a multilayer perceptron model, a long short-term memory (LSTM) model, a bidirectional LSTM model, a Prophet model, or a clustering model, and wherein the steady state data is associated with a forecasted range for multiple percentiles in a future time related to the KPIs, that is determined based on using the machine learning model;

receive new KPIs corresponding to a network device to be added to the network;

generate new features based on the new KPIs;

compare, during onboarding of the network device, the steady state data with the new KPIs and the new features to identify one or more anomalies corresponding to the network device being onboarded to be added to the network, wherein comparing the steady state data comprises:

utilizing for the comparison, a subset of the steady state data corresponding to a subset of particular network devices of a same device type the plurality of network devices as a type of device of the network device, wherein the subset of the steady state data further corresponds to the particular network devices located in a same geographical location as the network device and of the same type of device; and perform one or more actions based on the one or more anomalies.

9. The device of claim 8, wherein the plurality of network devices are selected based on one or more of device types of the plurality of network devices or geographical locations of the plurality of network devices.

10. The device of claim 8, wherein the one or more processors, to compare the steady state data with the new KPIs and the new features to identify the one or more anomalies, are to:

identify, from the plurality of network devices, a set of network devices similar to the network device to be added to the network; and compare the steady state data, corresponding to the set of network devices, with the new KPIs and the new features to identify the one or more anomalies.

11. The device of claim 8, wherein the one or more processors, to perform the one or more actions, are to:

provide a notification about the one or more anomalies; or modify a configuration of the network device to correct the one or more anomalies.

12. The device of claim 8, wherein the one or more processors, to perform the one or more actions, are to one or more of:

cause a technician to be dispatched to correct the one or more anomalies;

cause an autonomous vehicle to be dispatched to correct the one or more anomalies; or retrain the machine learning model based on the one or more anomalies.

13. The device of claim 8, wherein the one or more processors, to perform the one or more actions, are to:

prevent the network device from being added to the network based on the one or more anomalies.

14. The device of claim 8, wherein the one or more anomalies correspond to one or more components of the network device.

15. A non-transitory computer-readable medium storing a set of instructions, the set of instructions comprising:

one or more instructions that, when executed by one or more processors of a device, cause the device to:

receive key performance indicators (KPIs) corresponding to a plurality of network devices of a network;

generate features based on the KPIs by generating the features corresponding to the KPIs related to components of the plurality of network devices, wherein the plurality of network devices include different types of network devices;

select boundaries for a machine learning model based on the KPIs and the features;

process the KPIs and the features, with the machine learning model and based on the boundaries, to generate steady state data corresponding to the plurality of network devices, wherein the steady state data is associated with a forecasted range for multiple percentiles in a future time related to the KPIs, that is determined based on using the machine learning model;

receive new KPIs corresponding to a network device to be added to the network;

generate new features based on the new KPIs;

compare, during onboarding of the network device, the steady state data with the new KPIs and the new features to identify one or more anomalies corresponding to the network device being onboarded to be added to the network, wherein comparing the steady state data comprises:

utilizing for the comparison, a subset of the steady state data corresponding to a subset of particular network devices of a same device type of the plurality of network devices as a type of device of the network device, wherein the subset of the steady state data further corresponds to the particular network devices located in a same geographical location as the network device and of the same type of device, and wherein the one or more anomalies correspond to one or more components of the network device; and perform one or more actions based on the one or more anomalies.

16. The non-transitory computer-readable medium of claim 15, wherein the one or more instructions, that cause the device to select the boundaries for the machine learning model based on the KPIs and the features, cause the device to:

select one of percentile boundaries, confidence interval boundaries, minimum-maximum boundaries, or interquartile range boundaries for the machine learning model based on the KPIs and the features.

17. The non-transitory computer-readable medium of claim 15, wherein the steady state data corresponding to the plurality of network devices includes data identifying means and ranges for the KPIs and the features.

18. The non-transitory computer-readable medium of claim 15, wherein the one or more instructions, that cause the device to compare the steady state data with the new KPIs and the new features to identify the one or more anomalies, cause the device to:

identify, from the plurality of network devices, a set of network devices similar to the network device to be added to the network; and compare the steady state data, corresponding to the set of network devices, with the new KPIs and the new features to identify the one or more anomalies.

19. The non-transitory computer-readable medium of claim 15, wherein the one or more instructions, that cause the device to perform the one or more actions, cause the device to one or more of:

provide a notification about the one or more anomalies; or modify a configuration of the network device to correct the one or more anomalies.

20. The non-transitory computer-readable medium of claim 15, wherein the one or more instructions, that cause the device to perform the one or more actions, cause the device to one or more of:

cause a technician to be dispatched to correct the one or more anomalies;

cause an autonomous vehicle to be dispatched to correct the one or more anomalies;

retrain the machine learning model based on the one or more anomalies; or prevent the network device from being added to the network based on the one or more anomalies.

* * * * *